UNITED STATES PATENT OFFICE.

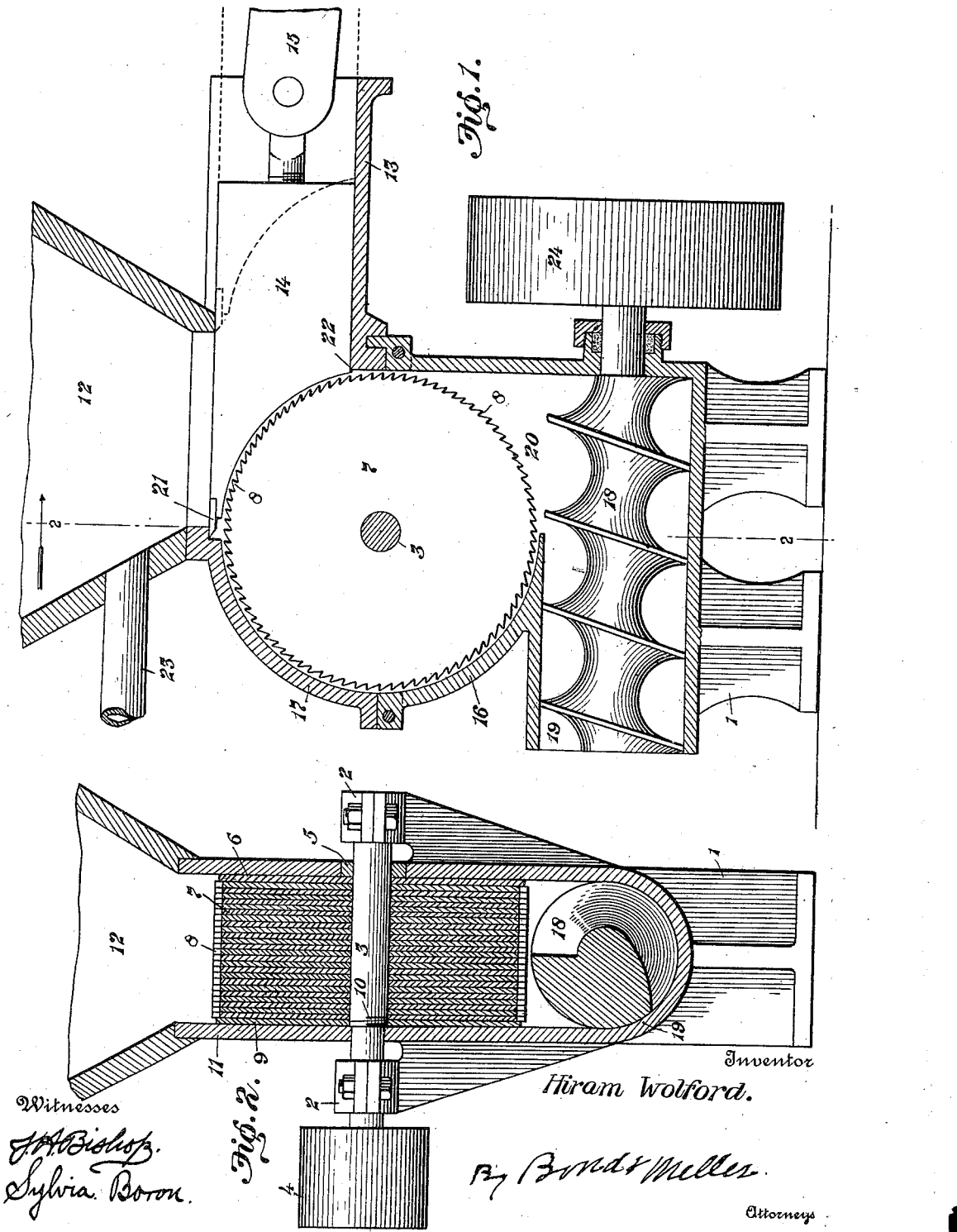

HIRAM WOLFORD, OF CANTON, OHIO.

VEGETABLE-GRATER.

1,032,720. Specification of Letters Patent. Patented July 16, 1912.

Application filed February 19, 1912. Serial No. 678,437.

*To all whom it may concern:*

Be it known that I, HIRAM WOLFORD, a citizen of the United States, residing at Canton, in the county of Stark and State of Ohio, have invented certain new and useful Improvements in Vegetable-Graters; and I do hereby declare the following to be a full, clear, and exact description of the invention, such as will enable others skilled in the art to which it belongs to make and use the same.

My invention relates to that class of vegetable graters, especially designed for grating or cutting vegetables, and the present invention has more specific relation to the grating of horseradish, but of course, other vegetables of the root nature can be acted upon.

It is well understood that in the preparation of horseradish for table use it is of importance that it be reduced to the condition of pulp.

The invention further consists in providing means whereby the horseradish can be ground or reduced so as to bring all of the particles to substantially the same relative size and further to provide means for grinding or cutting in what might be termed a water bath. I have learned from experience that if water is not employed the ground product becomes discolored, but when ground or cut in a water bath the original color of the horseradish is retained.

In the accompanying drawing—Figure 1 is a vertical longitudinal sketch. Fig. 2 is a transverse section taken on line 2—2, Fig. 2.

Similar numerals of reference indicate similar parts in all the figures of the drawing.

In the accompanying drawing, 1 represents the frame or body of the machine proper, which frame or body is formed of sufficient strength to support the different parts, and is so formed that the various parts can be attached in proper relation with reference to each other. It will also be understood that the frame or body is to be held in a rigid and vertical position and if desired the base of the body may be bolted or otherwise attached to the foundation upon which the machine proper rests.

In suitable bearings 2 is journaled the shaft 3, to which shaft is attached in any convenient and well known manner a power wheel 4, which power wheel is driven by a belt or its equivalent. Upon the shaft 3 is securely attached the holding collar 5 against which holding collar is the non-toothed disk 6. Upon the shaft 3 are mounted a series of blades 7, which are provided with cutting teeth 8 which teeth are formed in substantially the same manner as the teeth upon ordinary circular saws. The series of saw blades or disks 7 are located face to face, thereby producing what might be termed a cylinder having saw teeth upon its periphery. These various blades 7 are held in close contact with each other by means of the fixed collar 5 and the disk 6 and the non-toothed disk 9, which non-toothed disk is preferably located upon the screw threaded portion 10 of the shaft 3. The non-toothed disks 6 and 9 and the blades 7 are located in the chamber or housing 11 to which housing or chamber 11 is connected the hopper 12, which hopper is to receive and hold the material designed to be cut or ground, and from which hopper the material is fed into the machine and against the teeth of the saws.

Below the hopper 12 is located the plunger casing or housing 13, in which casing or housing is slidably mounted the plunger 14, which plunger is reciprocated to or from the saw blades 7 by means of a suitable pitman 15, which pitman is connected to a crank pin or its equivalent. The means for actuating the pitman 15 are not illustrated as it will be understood that any means for imparting reciprocating movement to the plunger 14 can be employed as the present invention has no specific reference as to the manner of actuating the plunger, further than to provide means for imparting a reciprocating movement to and from the cutting or grinding saw blades 7.

For the purpose of inclosing the rear portions of the saw blades 7 the chamber in which the saw blades are located is inclosed by means of the curved sections 16 and 17, the curvature of said sections 16 and 17 corresponding with the curvature of the peripheries of the saw blades, so that the inner surfaces of said sections will be substantially concentric with reference to the shaft 3.

Directly below the saw blades 7 is located the conveyer screw 18, which conveyer screw is for the purpose of removing the cut or ground product, and for the purpose of properly conveying the cut or ground product, the rear portion of the delivery screw 18 is located in the cylinder 19, said cylinder being preferably formed integral with the body or frame of the machine proper.

Directly below the vertical centers of the saws or substantially directly below the vertical centers of said saws is located the inner end of the conveying screw cylinder, which cylinder opens into the chamber 20 below the saw blades. The lower edge of the lower section 16 is located near the teeth 8 and is so located for the purpose of preventing the material from being carried upward by the saw teeth except a comparatively small quantity which may adhere to the saw teeth. The reciprocating plunger 14 is provided at its inner upper portion with the cutting knife 21, which cutting knife is formed of a length substantially equal to the width of the chamber in which the series of saw blades are located.

In use the horseradish or other vegetables designed to be cut or ground are placed in the hopper and when the plunger 14 is moved away from the saws the horseradish falls from the hopper and in contact with the saw teeth. After the plunger 14 has moved away from the saw blades its full distance, a quantity of horseradish will be located between the saw teeth and the inner end of the plunger 14, and as the plunger 14 moves toward the saw-blades the material designed to be cut or ground will be forced against the saw teeth, thereby bringing the material into cutting or grinding contact with the saw teeth. As the knife 21 moves toward the saw teeth together with the plunger 14 the horseradish or other material will be cut, the portion or portions located above the knife and plunger remaining in the hopper and the parts or portions below the knife will be located between the saw teeth and the inner curved end of the plunger 14. For the purpose of bringing all of the material designed to be cut or ground in close contact with the teeth the inner end of the plunger is curved, the curvature corresponding substantially with the curvature of the saw-blades or cylinder made up of the series of saw-blades. By the reciprocating action of the plunger 14 the material is forced against the series of saws and cut or ground. For the purpose of preventing partially cut or ground material from entering the chamber in which the conveyer screw 18 is located, the inner lower end of the plunger casing 13 is located in close proximity to the teeth of the saws. It will, however, be understood that the cutting action of the teeth will be brought into effect during the time the plunger 14 is moving toward the saws so that a considerable surface of the periphery of the cylinder made up of the series of saw-blades will be brought into cutting action, thereby removing the heavy strain from the inner end of the plunger casing 13.

The shaft 3 upon which the saws are mounted is designed to be driven at a high speed in order to provide a rapid cutting action, but it will be understood that the movement of the reciprocating plunger should be such that the saws will cut practically all the material located between the inner curved end of the plunger and the teeth during its forward movement, but if in the event the material is not properly reduced during this forward movement the excess will be forced upward or into the hopper, but for the purpose of better confining the material and holding it in position to be acted upon by the saws the inner end of the plunger is curved. It will also be understood that as the saws move downward or in a downward direction when they are in cutting action the tendency of the saws will be to prevent any upward movement of the material to be cut or ground. After the material has passed the inner end of the plunger casing or more specifically the edge 22, the cut or ground material falls upon the conveyer screw 18 and is carried or moved and delivered by said conveyer screw. The rotation of the conveyer screw should be comparatively slow so that the material will be moved slowly and if in the event the material is not removed by the conveyer screw as rapidly as it is fed into the machine the surplus will be carried upward and again acted upon as originally.

It will be understood that if in the event the conveyer screw does not remove the material as rapidly as it is fed into the machine, the same will be crowded against the teeth of the blades 7 and any surplus material will be carried upward between the series of saw blades and the sections 16 and 17 constituting the casing of the rear portions of the saw blades.

For the purpose of preventing discoloration of the cut or ground horseradish or other material water is employed and for the purpose of supplying water or more conveniently supplying water and at the same time regulating the supply, the water conductor pipe 23 is provided, which pipe is connected to any source of supply in the usual manner.

It will be understood that some means must be provided for rotating the conveyer screw 18 and I have illustrated the conveyer screw provided with a power wheel 24 which is driven from any source. The conveyer screw 18 is rotated slowly as compared with the rotation of the cutting blades so that the material passing from the dropper is allowed to accumulate or in other words is not conveyed as rapidly as it is delivered upon the conveyer screw. The surplus material is thus given the second or further cutting action by reason of the same being acted upon by the inner projection of the casing 16 before its final delivery; but it will be understood that the rotation of the conveyer screw should be of sufficient rapidity to prevent any choking, all the material being either conveyed by the conveyer screw or acted upon or again cut as it is carried by the inner projection of the casing 16.

Having fully described my invention, what I claim as new and desire to secure by Letters Patent, is—

1. In a grater of the class described, the combination of a frame, a shaft journaled in the frame, a cutting cylinder mounted upon the shaft, means for incasing the rear portion of the cutting cylinder, a reciprocating plunger, a casing adapted to guide said reciprocating plunger, the lower portion of said casing located in close proximity with the cutting cylinder and a conveying screw located below the cutting cylinder and the inclosing casing of the cutting cylinder extended into the chamber below the cutting cylinder between said cutting cylinder and conveying screw.

2. In a grater of the class described, the combination of a frame, a shaft journaled in the frame, a series of saw blades mounted upon the shaft and located face to face, a reciprocating plunger provided with an inner curved end and a cutting knife located upon and carried by the plunger, a casing adapted to guide said plunger, a conveying screw located below the saw blades and extended beyond the chamber containing the saw blades and a curved casing located at the rear of the saw blades and in close proximity therewith, substantially as and for the purpose specified.

In testimony that I claim the above, I have hereunto subscribed my name in the presence of two witnesses.

HIRAM WOLFORD.

Witnesses:
  JOHN H. BISHOP,
  F. W. BOND.

---

Copies of this patent may be obtained for five cents each, by addressing the "Commissioner of Patents, Washington, D. C."